United States Patent
Inoue et al.

(10) Patent No.: US 12,020,095 B2
(45) Date of Patent: Jun. 25, 2024

(54) PRINTER AND INFORMATION PROCESSING SYSTEM

(71) Applicant: TOSHIBA TEC KABUSHIKI KAISHA, Tokyo (JP)

(72) Inventors: Yoshimasa Inoue, Singapore Singapore (SG); Hiroyuki Inaba, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 17/541,304

(22) Filed: Dec. 3, 2021

(65) Prior Publication Data

US 2022/0300776 A1    Sep. 22, 2022

(30) Foreign Application Priority Data

Mar. 17, 2021    (JP) .................................. 2021-043684

(51) Int. Cl.
| | | |
|---|---|---|
| *G06K 15/00* | (2006.01) | |
| *B41J 11/66* | (2006.01) | |
| *G06K 15/02* | (2006.01) | |
| *G06Q 20/20* | (2012.01) | |

(52) U.S. Cl.
CPC ......... *G06K 15/4055* (2013.01); *B41J 11/663* (2013.01); *G06K 15/028* (2013.01); *G06K 15/403* (2013.01); *G06Q 20/208* (2013.01); *G06Q 20/209* (2013.01)

(58) Field of Classification Search
CPC ............ G06K 15/4055; G06K 15/028; G06K 15/403; G06K 15/186; B41J 11/663; B41J 11/66; G06Q 20/208; G06Q 20/209; G07G 5/00
See application file for complete search history.

(56) References Cited

U.S. PATENT DOCUMENTS

2013/0050384 A1 *   2/2013   Sugimoto ................ B41J 11/66
                                                                347/218
2017/0289378 A1 *  10/2017   Tsukui ................ G06K 15/406

FOREIGN PATENT DOCUMENTS

JP          2015-80890          4/2015

* cited by examiner

*Primary Examiner* — Lisa Solomon
(74) *Attorney, Agent, or Firm* — Amin, Turocy & Watson, LLP (57) ABSTRACT

Provided is a technique for controlling shift of an operation mode from a normal mode to a sleep mode. A printer according to one embodiment includes a print head, a cutter, a detection unit, and a mode control unit. The print head prints an image based on print data on a recording medium. The cutter cuts the recording medium based on a cut command. The detection unit detects that a duration time of an idle state in a first mode exceeds a predetermined time. The mode control unit changes, in response to the detection unit detecting that the duration time of the idle state exceeds the predetermined time, control of shifting an operation mode from the first mode to a second mode in which consumed power is lower than that of the first mode, in accordance with an event related to shift to the idle state.

19 Claims, 5 Drawing Sheets

AAA  Store

| | | |
|---|---|---|
| 001 | xxxxxxx | $1.00 |
| 002 | yyyyyy | $1.50 |
| 003 | zzzzzzz | $3.00 |
| 004 | wwwwww | $5.50 |

| | |
|---|---|
| Total | $11.00 |

FIG. 5

AAA  Store

| | | |
|---|---|---|
| 001 | xxxxxxx | $1.00 |
| 002 | yyyyyy | $1.50 |
| 003 | zzzzzzz | $3.00 |
| 004 | wwwwww | $5.50 |

| | |
|---|---|
| Total | $11.00 |

FIG. 6

PRINTER AND INFORMATION PROCESSING SYSTEM

CROSS-REFERENCE TO RELATED APPLICATION

This application is based upon and claims the benefit of priority from Japanese Patent Application No. 2021-043684, filed on Mar. 17, 2021, the entire contents of which are incorporated herein by reference.

FIELD

Embodiments described herein relate generally to a printer and an information processing system.

BACKGROUND

Many settlement processing apparatuses related to transfer of money, such as a point of sales (POS) terminal, a settlement processing terminal, and an automatic adjustment machine, transmit print data to be printed on a receipt and a cut command to a printer to dispense the receipt. At this time, when data communication with the settlement processing apparatus is interrupted, and a predetermined time elapses, the printer shifts to a sleep mode. However, when the printer shifts to the sleep mode before the printer receives the cut command, a print position on the receipt may be clogged when printing is performed on the receipt based on print data received after the sleep mode.

DETAILED DESCRIPTION

In general, according to one embodiment, a technique for controlling shift of an operation mode from a normal mode to a sleep mode is provided.

A printer according to an embodiment includes a print head, a cutter, a detection unit, and a mode control unit. The print head prints an image based on print data on a recording medium. The cutter cuts the recording medium based on a cut command. The detection unit detects that a duration time of an idle state in a first mode exceeds a predetermined time. The mode control unit changes, in response to the detection unit detecting that the duration time of the idle state exceeds the predetermined time, control of shifting an operation mode from the first mode to a second mode in which consumed power is lower than that of the first mode, in accordance with an event related to a shift to the idle state.

Figure 1:
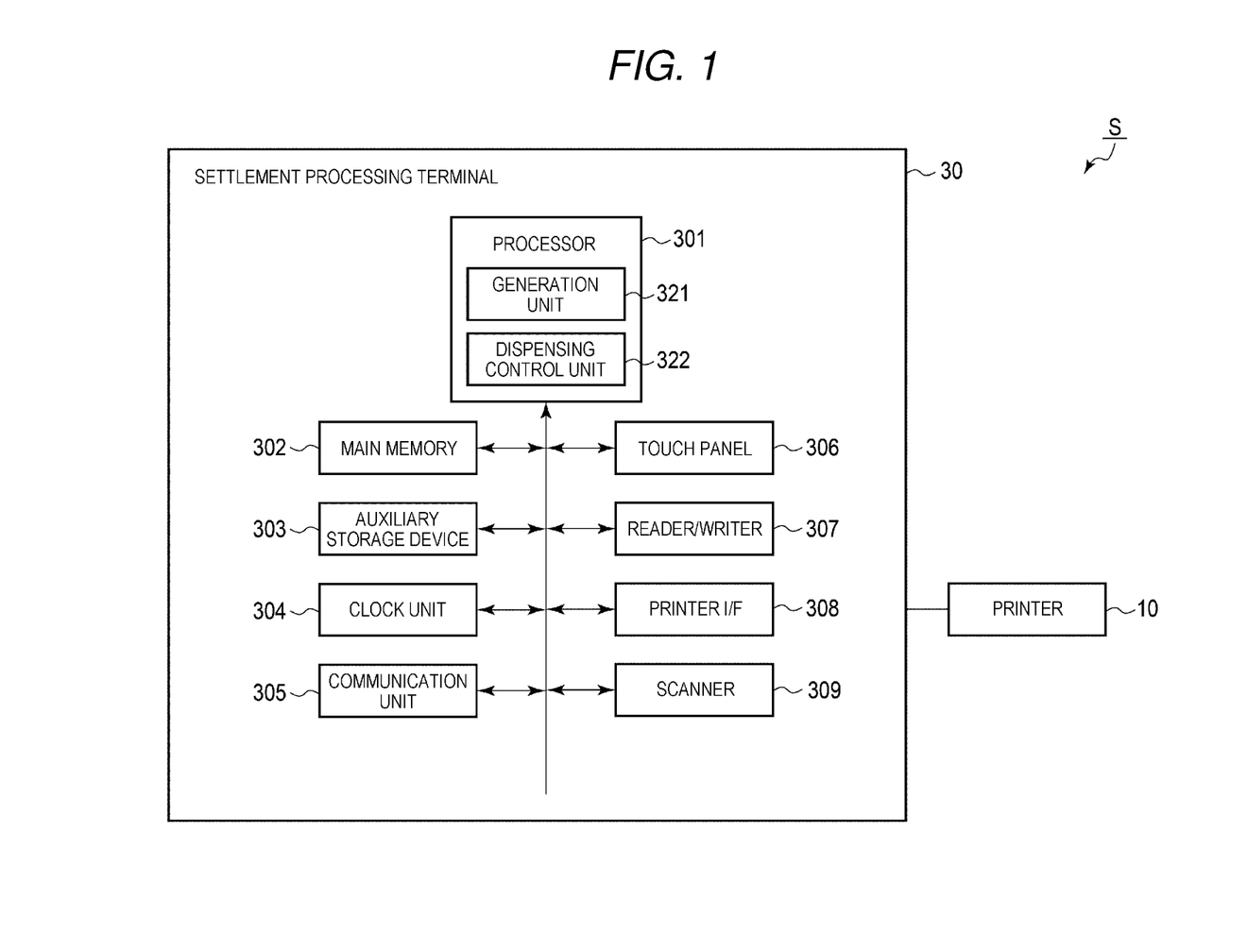
FIG. 1 is a block diagram illustrating an information processing system according to an embodiment.

Hereinafter, an embodiment will be described with reference to drawings. FIG. 1 is a block diagram illustrating an information processing system S. The information processing system S includes a printer 10 and a settlement processing terminal 30. The printer 10 and the settlement processing terminal 30 are communicably connected to each other via a network in a wired or wireless manner. For example, the network is a local area network (LAN) or the like but not limited thereto.

The printer 10 is an electronic device for printing receipts, slips, and the like. For example, the printer 10 is a thermal printer, an inkjet printer, or the like. The printer 10 will be described by taking a thermal printer as an example. The printer 10 receives print data from the settlement processing terminal 30 via a printer interface 308. The print data includes a part of store identification data identifiably indicating a store such as a store name of the store, a logo of the store, and the like, checkout data indicating a product name, an amount, a total amount, and the like of a purchased commodity of a customer, and the like. A configuration example of the printer 10 will be described later. In FIG. 1, an interface is described as "I/F".

The settlement processing terminal 30 is an electronic device that can perform settlement on the purchased commodity. The settlement processing terminal 30 includes a processor 301, a main memory 302, an auxiliary storage device 303, a clock unit 304, a communication unit 305, a touch panel 306, a reader/writer 307, a printer interface 308, and a scanner 309. The processor 301 is electrically and communicably connected to the main memory 302, the auxiliary storage device 303, the clock unit 304, the communication unit 305, the touch panel 306, the reader/writer 307, the printer interface 308, and the scanner 309.

The processor 301 corresponds to a central portion of the settlement processing terminal 30. For example, the processor 301 is a central processing unit (CPU) but not limited thereto. The processor 301 may be formed of various circuits. The processor 301 loads, in the main memory 302, programs stored in advance in the main memory 302 and the auxiliary storage device 303. The programs are programs that cause the processor 301 of the settlement processing terminal 30 to implement or execute each unit to be described later. The processor 301 executes various operations by executing the program loaded in the main memory 302.

The main memory 302 corresponds to a main storage portion of the settlement processing terminal 30. The main memory 302 includes a non-volatile memory region and a volatile memory region. The main memory 302 stores an operating system or the program in the non-volatile memory region. The main memory 302 uses the volatile memory region as a work area in which data is appropriately rewritten by the processor 301. For example, the main memory 302 includes a read only memory (ROM) as the non-volatile memory region. For example, the main memory 302 includes a random access memory (RAM) as the volatile memory region. The main memory 302 stores the program.

The auxiliary storage device 303 corresponds to an auxiliary storage portion of the settlement processing terminal 30. The auxiliary storage device 303 is an electric erasable programmable read-only memory (EEPROM (registered trademark)), a hard disc drive (HDD), a solid state drive (SSD), or the like. The auxiliary storage device 303 stores the above-described programs, data used when the processor 301 performs various processes, and data generated by the processor 301 performing the processes.

The clock unit 304 functions as a time information source of the settlement processing terminal 30. The processor 301 tracks a current date and time based on time information tracked by the clock unit 304.

The communication unit 305 is connected to a registration terminal via a wired or wireless network, and receives the checkout data sent from the registration terminal.

The touch panel 306 functions as an input device and a display device of the settlement processing terminal 30. The display device is a device capable of displaying various screens under control of the processor 301. A device for a store clerk and a device for a customer may be separately provided. For example, the display device is a liquid crystal display, an electroluminescence (EL) display, or the like. The input device is a device that functions as a data input interface to the settlement processing terminal 30. For example, the input device is a keyboard, a touch panel, or the like.

The reader/writer 307 reads data recorded on a recording medium such as a card or an integrated circuit (IC) chip, which is a kind of payment medium, and writes the data into the recording medium. The card includes not only payment cards such as a credit card, a debit card, an electronic money card, and a prepaid card, but also various cards such as a membership card and a point card that record information related to a settlement process. The IC chip may be provided in an information terminal such as a smartphone in addition to the various cards described above.

The printer interface 308 connects the settlement processing terminal 30 and the printer 10. The printer interface 308 outputs the print data generated by the processor 301 to the printer 10. "Output" includes the meaning of "transmit".

The scanner 309 scans and reads a barcode or the like of the purchased commodity held over a reading window. Each time a barcode symbol attached to the purchased commodity is held over the reading window, the scanner 309 reads the barcode. Here, the barcode may be read as a two-dimensional data code. The scanner 309 may be of a type that reads a code symbol by scanning the code symbol with a laser beam. The scanner 309 may be of a type that reads the code symbol from an image captured by an imaging device such as a camera.

A hardware configuration of the settlement processing terminal 30 is not limited to the above-described configuration. In the settlement processing terminal 30, the above-described components can be appropriately omitted and changed, and new components can be added.

Each unit installed in the above-described processor 301 will be described. In the processor 301, a generation unit 321 and a dispensing control unit 322 are installed. Each unit installed in the processor 301 can also be referred to as each function. It can also be said that each unit installed in the processor 301 is installed in a control unit including the processor 301 and the main memory 302.

The generation unit 321 generates the print data. For example, the generation unit 321 generates the print data including the store identification data based on a start of one transaction. One transaction is picking up of the purchased commodity based on settlement. The store identification data is an example of print data in the start of one transaction. The generation unit 321 generates the print data including the checkout data of each purchased commodity for each registration of the purchased commodity in one transaction by using the scanner 309. The checkout data of each purchased commodity is an example of print data in the middle of one transaction. The generation unit 321 generates print data including the checkout data of the total amount based on an end of one transaction. The end of one transaction includes an end of a settlement process of one transaction. The checkout data of the total amount is an example of print data in the end of one transaction.

In response to the generation of the print data performed by the generation unit 321, the dispensing control unit 322 outputs the print data to the printer 10 via the printer interface 308. For example, in response to the generation of the print data including the store identification data performed by the generation unit 321, the dispensing control unit 322 outputs the print data including the store identification data to the printer 10. In response to the generation of the print data including the checkout data performed by the generation unit 321, the dispensing control unit 322 outputs the print data including the checkout data to the printer 10. The dispensing control unit 322 outputs a cut command indicating the cutting of receipt paper to the printer 10 via the printer interface 308. For example, the dispensing control unit 322 outputs the cut command to the printer 10 after outputting the last print data of one transaction to the printer 10 based on the end of one transaction. The dispensing control unit 322 controls dispensation of the receipt on which an image based on the print data is printed. In the following description, "in response to" may be read as "based on".

Figure 2:
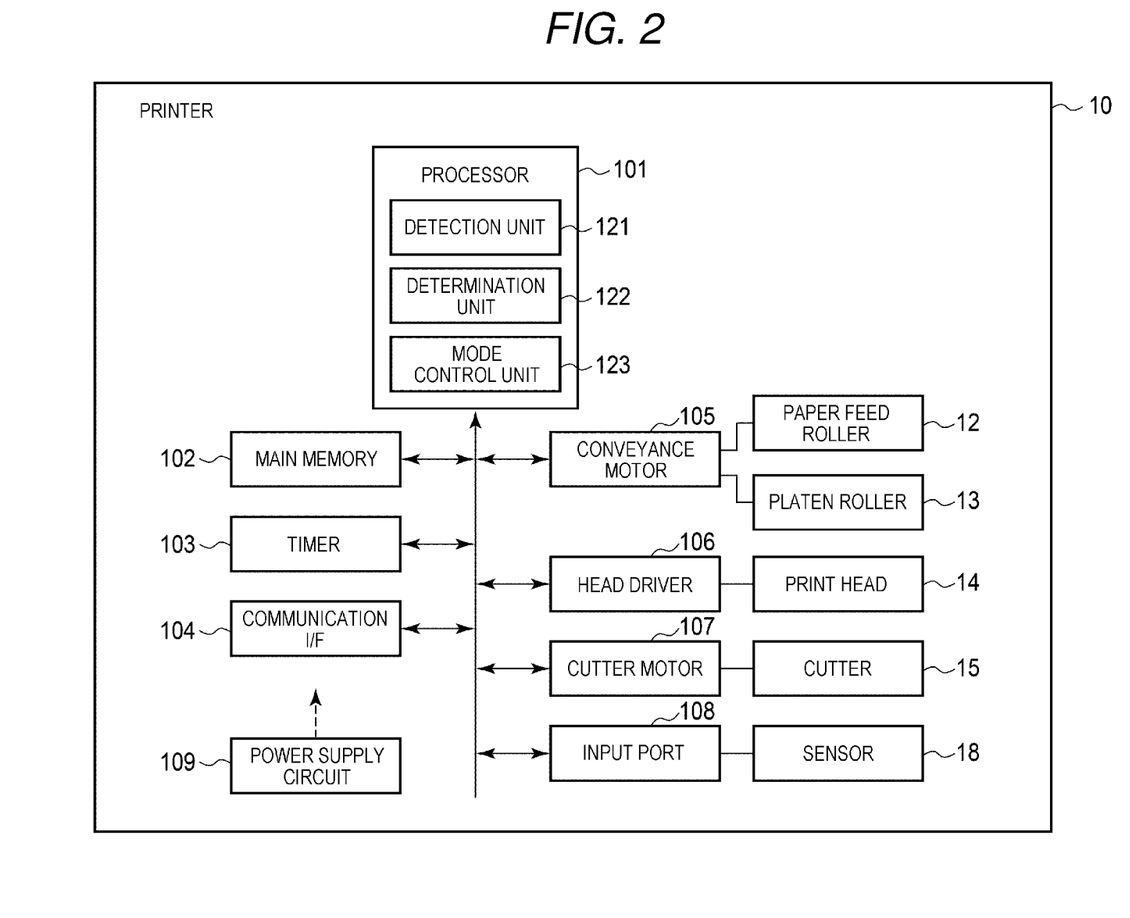
FIG. 2 is a block diagram illustrating an outline of a configuration example of a printer according to the embodiment.

The configuration example of the printer 10 will be described. FIG. 2 is a block diagram illustrating an outline of the configuration example of the printer 10 according to the embodiment. The printer 10 includes a paper feed roller 12, a platen roller 13, a print head 14, a cutter 15, a sensor 18, a processor 101, a main memory 102, a timer 103, a communication interface 104, a conveyance motor 105, a head driver 106, a cutter motor 107, an input port 108, and a power supply circuit 109. The processor 101 is electrically and communicably connected to the main memory 102, the timer 103, the communication interface 104, the conveyance motor 105, the head driver 106, the cutter motor 107, and the input port 108. Configuration examples of the paper feed roller 12, the platen roller 13, the print head 14, the cutter 15, and the sensor 18 will be described later. In FIG. 2, an interface is described as "I/F".

The processor 101 corresponds to a central portion of the printer 10. The processor 101 has a hardware configuration similar to that of the processor 301 described above. The processor 101 loads, in the main memory 102, a program stored in advance in the main memory 102. The program is a program that causes the processor 101 of the printer 10 to implement or execute each unit to be described later. The processor 101 executes various operations by executing the program loaded in the main memory 102.

The main memory 102 corresponds to a main storage portion of the printer 10. The main memory 102 has a hardware configuration similar to that of the processor 302 described above. The main memory 102 stores the program.

The timer 103 tracks a preset time. The timer 103 times out when the set time is tracked. The set time is any time. The timer 103 resets the tracked time under control of the processor 101.

The communication interface 104 includes various interfaces for communicably connecting the printer 10 to other electronic devices via a network in accordance with a predetermined communication protocol. The communication interface 104 connects the printer 10 and the settlement processing terminal 30, and performs data communication with the settlement processing terminal 30.

The conveyance motor 105 drives the paper feed roller 12 and the platen roller 13. The paper feed roller 12 and the platen roller 13 are rotated in a predetermined direction by the driving of the conveyance motor 105, so as to convey the strip-shaped receipt paper wound in a roll shape to a receipt dispensing port. The receipt paper is an example of the recording medium. The conveyance motor 105 is an example of a component related to the printing.

The head driver 106 is a drive circuit for driving the print head 14. The print head 14 prints an image based on the print data from the settlement processing terminal 30 on the receipt paper by the driving of the head driver 106. The print head 14 is also referred to as a thermal head. The head driver 106 is an example of the component related to the printing.

The cutter motor 107 drives a movable blade of the cutter 15. The cutter motor 107 is capable of driving the movable blade in two stages, that is, a partial cutting drive and a full cutting drive. When the cutter motor 107 drives the movable blade in the partial cutting drive, the cutter 15 performs partial cutting in which a part of the receipt paper is left uncut. When the cutter motor 107 drives the movable blade in the full cutting drive, the cutter 15 performs full cutting in which the receipt paper is completely cut.

The input port 108 receives an ON signal or an OFF signal output from the sensor 18. The CPU 101 determines whether the sensor 18 detects the receipt paper based on the signal received by the input port 108.

The power supply circuit 109 converts AC power supplied from a commercial power supply into DC power, and supplies the DC power to the processor 101, the main memory 102, the timer 103, the communication interface 104, the conveyance motor 105, the head driver 106, the cutter motor 107, and the input port 108. The supply of the DC power may be read as power supply. The power supply circuit 109 may be controlled by the processor 101.

A hardware configuration of the printer 10 is not limited to the above-described configuration. In the printer 10, the above-described components can be appropriately omitted and changed, and new components can be added.

Each unit installed in the above-described processor 101 will be described. In the processor 101, a detection unit 121, a determination unit 122, and a mode control unit 123 are installed. Each unit installed in the processor 101 can also be referred to as each function. It can also be said that each unit installed in the processor 101 is installed in a control unit including the processor 101 and the main memory 102.

The detection unit 121 uses the timer 103 to detect a duration time of an idle state in a normal mode of the printer 10. The detection unit 121 detects that the duration time of the idle state exceeds a predetermined time. The duration time of the idle state is a time during which the idle state is continued from a timing at which the printer 10 is shifted from an operating state to the idle state. The operating state and the idle state will be described later. The normal mode is one of operation modes of the printer 10. The normal mode is an example of a first mode. The operation modes of the printer 10 will be described later. The predetermined time is, for example, several seconds or several tens of seconds. The predetermined time may be set in advance, or may be appropriately updated by a user of the printer 10 or the like.

The determination unit 122 determines an event related to the shift to the idle state. The event related to the shift to the idle state is an event that causes the printer 10 to be shifted from the operating state to the idle state. For example, the event related to the shift to the idle state includes a cut event based on the cut command from the settlement processing terminal 30, interruption of communication from the settlement processing terminal 30, and the like. The cut event includes cutting of the receipt paper by the cutter 15 based on the cut command. The notation of "cutting" may be read as either the partial cutting or the full cutting. The interruption of the communication includes that the printer 10 does not acquire the cut command after acquiring the print data in the start of one transaction from the settlement processing terminal 30. For example, the interruption of the communication occurs as an interval of the registration of the purchased commodity in one transaction becomes long. As the interval of the registration of the purchased commodity in one transaction becomes long, a transmission interval of the print data including the checkout data of the purchased commodity from the settlement processing terminal 30 to the printer 10 also becomes long. The determination unit 122 determines whether the event related to the shift to the idle state is the cut event based on the cut command from the settlement processing terminal 30. The cut event corresponds to the event based on the cut command.

The mode control unit 123 changes control of shifting the operation mode from the normal mode to a sleep mode in accordance with the event related to the shift to the idle state. The mode control unit 123 shifts the operation mode of the printer 10 from the normal mode to the sleep mode in response to the event related to the shift being the cut event. The mode control unit 123 maintains the operation mode of the printer 10 in the normal mode in response to the event related to the shift not being the cut event. The sleep mode is an example of a second mode.

The operation modes of the printer 10 will be described. The printer 10 has at least the normal mode and the sleep mode. The normal mode is a mode in which the power supply from the power supply circuit 109 to the processor 101, the main memory 102, the timer 103, the communication interface 104, the conveyance motor 105, the head driver 106, the cutter motor 107, the input port 108, and the like is maintained. The sleep mode is a mode in which the power consumed by the printer 10 is reduced as compared with the normal mode. The sleep mode is a mode in which the consumed power is lower than that in the normal mode. The sleep mode is also referred to as a power saving mode.

The normal mode includes a printing state, a cut state, the idle state, and the like. The printing state is a state in which a process of printing the image based on the print data from the settlement processing terminal 30 on the receipt paper is executed. The printing state is an example of the operation state in which the printer 10 operates. The cut state is a state in which a process of cutting receipt paper 20 based on the cut command from the settlement processing terminal 30 is executed. The cut state is an example of the operation state. The idle state is a state in which a process based on the print data and the cut command from the settlement processing terminal 30 can be executed. The idle state is also referred to as a standby state.

The sleep mode is a mode in which the power supply from the power supply circuit 109 to the conveyance motor 105, the head driver 106, the cutter motor 107, the input port 108, and the like is stopped, and the power supply to the processor 101, the main memory 102, the timer 103, the communication interface 104, and the like is maintained. In the sleep mode, objects to which the power supply is stopped and objects to which the power supply is maintained are not limited thereto. A reason why the power supply to a part of the printer 10 is maintained is to maintain a function related to communication between the printer 10 and the settlement processing terminal 30 even in the sleep mode.

Figure 3:
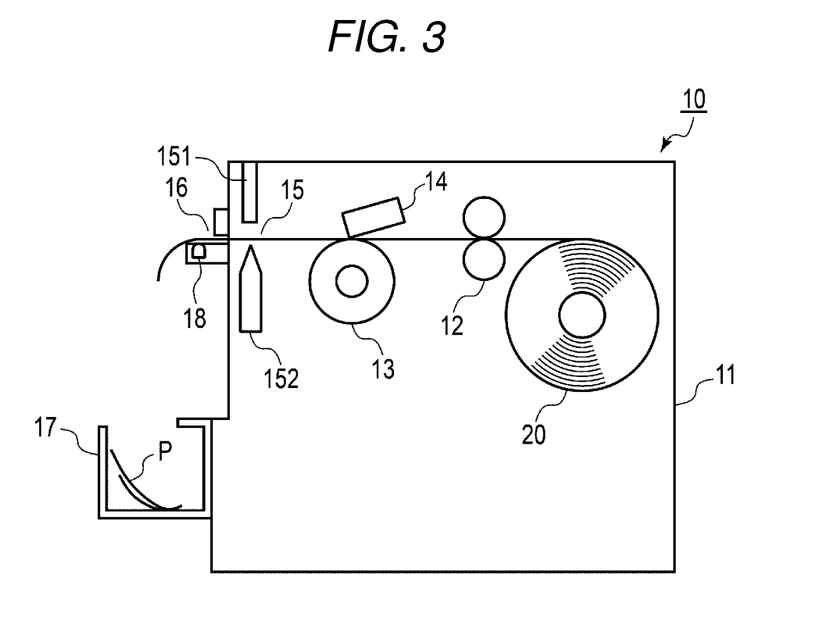
FIG. 3 is a schematic diagram illustrating a main part of the printer according to the embodiment.

A main part of the printer 10 will be described. FIG. 3 is a schematic diagram illustrating the main part of the printer 10 according to the embodiment. The printer 10 includes a housing 11 capable of accommodating the receipt paper 20. Then, in the printer 10, the paper feed roller 12, the platen roller 13, the print head 14, and the cutter 15 are disposed in the housing 11. In the printer 10, a receipt dispensing port 16 is provided on one side surface of the housing 11. Then, the printer 10 forms a paper conveyance path such that a leading end of the receipt paper 20 accommodated in the housing 11 is discharged from the receipt dispensing port 16.

The paper feed roller 12 is disposed on a most upstream side of the paper conveyance path, that is, on a side closest to the receipt paper 20 wound in a roll shape. A pair of paper feed rollers 12 sandwich the leading end of the receipt paper 20 fed out from the roll-shaped receipt paper 20, and convey the leading end to a downstream side by a rotation force of the paper feed roller 12.

The platen roller 13 is disposed on the downstream side of the paper feed roller 12. The platen roller 13 conveys the receipt paper 20 sent out from the paper feed roller 12 to a further downstream side by rotation of the platen roller 13.

The print head 14 is disposed at a position facing the platen roller 13 with the paper conveyance path interposed therebetween. The print head 14 prints the print data in a thermal manner on the receipt paper 20 conveyed on the platen roller 13.

The cutter 15 is disposed on a most downstream side of the paper conveyance path, that is, in front of the receipt dispensing port 16. The cutter 15 includes a fixed blade 151 disposed above the paper conveyance path, and a movable blade 152 disposed below the paper conveyance path, with the paper conveyance path interposed therebetween. The movable blade 152 moves upward, and the receipt paper 20 is pushed between the movable blade 152 and the fixed blade 151, so that the cutter 15 cuts the receipt paper 20 discharged from the receipt dispensing port 16 in front of the receipt dispensing port 16. At this time, the partial cutting or the full cutting is performed according to a movement amount of the movable blade 152. The cutter 15 cuts the receipt paper 20 based on the cut command from the settlement processing terminal 30.

A piece of paper P on a front end side of the receipt paper 20 that is subjected to the full cutting by the cutter 15 falls from the receipt dispensing port 16 due to gravity. Therefore, a box 17 below the receipt dispensing port 16 for accommodating the piece of paper P is attached to the printer 10. In the printer 10, the sensor 18 for detecting presence or absence of the receipt paper 20 discharged from the receipt dispensing port 16 is provided in the vicinity of the receipt dispensing port 16. The sensor 18 is, for example, an optical sensor, and outputs the ON signal when the receipt paper 20 is detected, and outputs the OFF signal when the receipt paper 20 is not detected.

Figure 4:
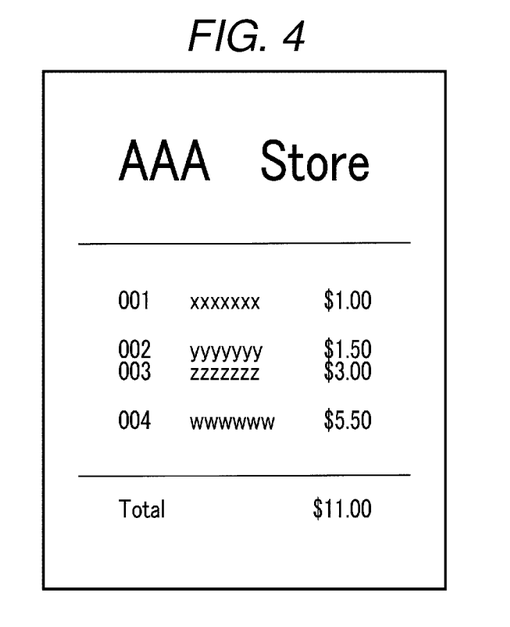
FIG. 4 is a diagram schematically illustrating an example of receipt paper printed by a printer according to a reference example.

An example of receipt paper printed by a printer will be described. FIG. 4 is a diagram schematically illustrating an example of receipt paper printed by a printer according to a reference example.

The printer prints an image based on the print data from the settlement processing terminal 30 on a receipt paper. The receipt paper includes a store name of a store that is set by the settlement processing terminal 30 and the printer, a product name, an amount, a total amount, and the like of a purchased commodity of a customer. In this example, it is assumed that the printer shifts to the sleep mode after print data including checkout data corresponding to an image indicated by "002" is received from the settlement processing terminal 30 and a duration time of the idle state exceeds a predetermined time. The printer shifts to the sleep mode, and power supply from a power supply circuit to a conveyance motor, a head driver, a cutter motor, an input port, and the like is stopped. As a result, phase control of the motors of the printer is initialized. In this state, the printer receives print data including checkout data corresponding to an image indicated by "003" from the settlement processing terminal 30. In response to the reception of the print data, the printer shifts to a normal mode and prints the image based on the print data on the receipt paper 20. Therefore, as illustrated in FIG. 4, in the printer according to the reference example, a phenomenon occurs in which a print position of the image based on the print data indicated by "003" immediately after the shift from the sleep mode to the normal mode is clogged.

Figure 5:
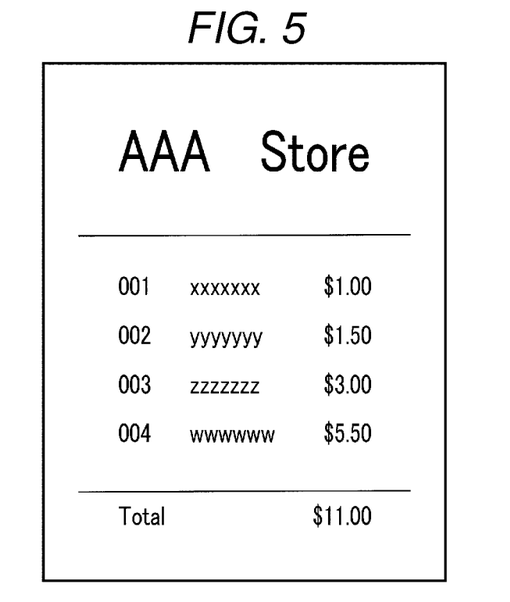
FIG. 5 is a diagram schematically illustrating an example of receipt paper printed by the printer according to the embodiment.

FIG. 5 is a diagram schematically illustrating an example of the receipt paper 20 printed by the printer 10 according to the embodiment.

The printer 10 prints the image based on the print data from the settlement processing terminal 30 on the receipt paper 20. The receipt paper 20 includes the store name of the store that is set by the settlement processing terminal 30 and the printer 10, the product name, the amount, the total amount, and the like of the purchased commodity of the customer. In this example, it is assumed that the printer 10 shifts to the idle state after the print data including the checkout data corresponding to the image indicated by "002" is received from the settlement processing terminal 30, and the detection unit 121 detects that the duration time of the idle state exceeds the predetermined time. The determination unit 122 determines whether the event related to the shift to the idle state is the cut event based on the cut command from the settlement processing terminal 30. In this example, the event related to the shift to the idle state is that the communication with the settlement processing terminal 30 is interrupted after the image based on the print data including the checkout data corresponding to the image indicated by "002" is printed. The event related to the shift to the idle state in this case is interruption of the communication with the settlement processing terminal 30 in a state in which the cut command is not received from the settlement processing terminal 30. The mode control unit 123 maintains the operation mode of the printer 10 in the normal mode in response to the determination unit 122 determining that the event related to the shift to the idle state is not the event based on the cut command. The printer 10 maintains a state in which the power is supplied from the power supply circuit 109 in the normal mode. Therefore, phase control of the motors of the printer 10 is not initialized.

In this state, the printer 10 receives the print data including the checkout data corresponding to the image indicated by "003" from the settlement processing terminal 30. In response to the reception of the print data, the printer 10 prints the image based on the print data on the receipt paper 20. In this example, as illustrated in FIG. 5, even when the printer 10 receives the print data indicated by "003" in the state in which the duration time of the idle state exceeds the predetermined time, the printer 10 can print the image based on the print data indicated by "003" at an appropriate print position. In the printer 10, unlike the printer according to the reference example, the phenomenon in which the print position of the image based on the print data immediately after the shift from the sleep mode to the normal mode is clogged does not occur.

Figure 6:
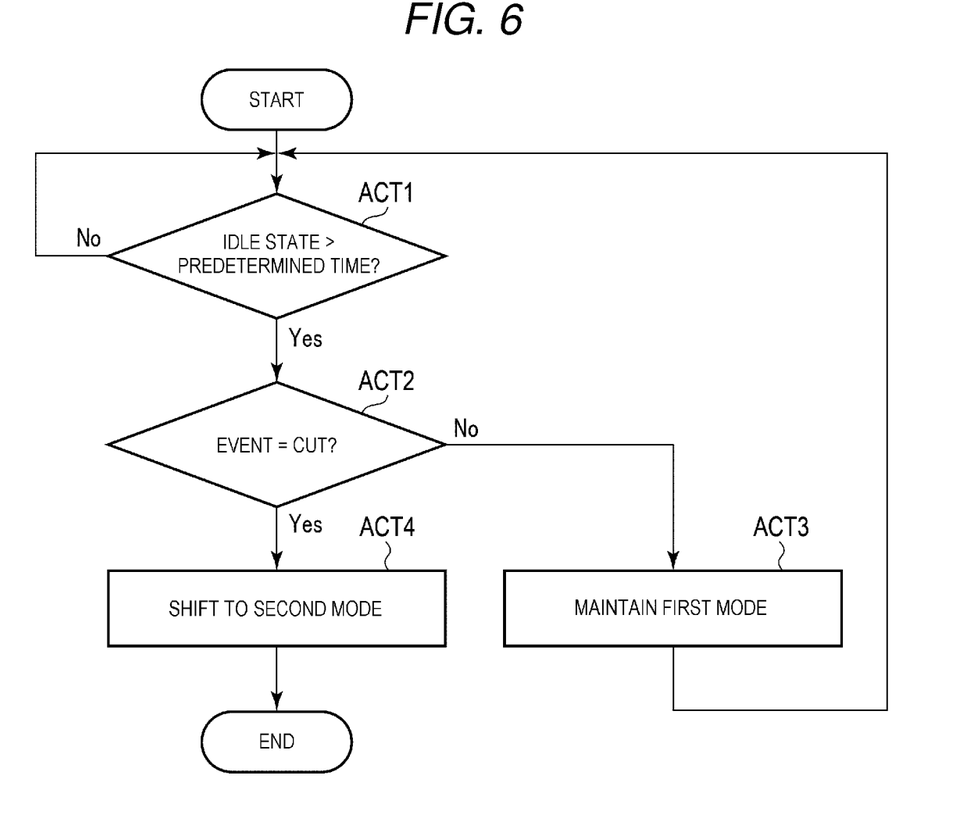
FIG. 6 is a flowchart illustrating a process performed by a processor of the printer according to the embodiment.

A procedure of a process performed by the processor 101 of the printer 10 will be described. FIG. 6 is a flowchart illustrating the process performed by the processor 101 of the printer 10 according to the embodiment. The procedure of the process described below is merely an example, and each processing may be changed as much as possible. In the procedure of the process described below, an operation may be appropriately omitted, replaced, and added according to the embodiment. It is assumed that the printer 10 is in the normal mode.

The detection unit 121 detects the duration time of the idle state in the normal mode of the printer 10 (ACT 1). In ACT 1, for example, the detection unit 121 detects that the duration time of the idle state exceeds the predetermined time. When the detection unit 121 detects that the duration time of the idle state exceeds the predetermined time (ACT 1: YES), the process transitions from ACT 1 to ACT 2. When the detection unit 121 detects that the duration time of the idle state does not exceed the predetermined time (ACT 1: NO), the process repeats ACT 1.

In response to the detection unit 121 detecting that the duration time of the idle state exceeds the predetermined time, the determination unit 122 determines the event related to the shift to the idle state (ACT 2). In ACT 2, for example, the determination unit 122 determines whether the event related to the shift to the idle state is the cut event based on the cut command from the settlement processing terminal 30. For example, the processor 101 stores the print data and the data such as the cut command from the settlement processing terminal 30 in the main memory 102. When the cut command is acquired from the settlement processing terminal 30, the processor 101 sets a flag indicating the cut command in the main memory 102. For example, the flag is set to "1" when the processor 101 acquires the cut command after acquisition of the print data of one transaction is started. The flag is set to "0" when the processor 101 does not acquire the cut command after the acquisition of the print data of one transaction is started. Based on the flag indicating the cut command, the determination unit 122 determines whether the event related to the shift to the idle state is the event based on the cut command. When the flag indicating the cut command is "1", the determination unit 122 determines that the event related to the shift to the idle state is the cut event based on the cut command. On the other hand, when the flag indicating the cut command is "0", the determination unit 122 determines that the event related to the shift to the idle state is not the cut event based on the cut command. The event related to the shift to the idle state not being the cut event includes that the event related to the shift to the idle state is the interruption of the communication with the settlement processing terminal 30.

When the determination unit 122 determines that the event related to the shift to the idle state is the cut event (ACT 2: YES), the process transitions from ACT 2 to ACT 4. When the determination unit 122 determines that the event related to the shift to the idle state is not the cut event (ACT 2: NO), the process transitions from ACT 2 to ACT 3. The mode control unit 123 changes the control of shifting the operation mode from the normal mode to the sleep mode in accordance with the event related to the shift to the idle state that is determined by the determination unit 122.

The mode control unit 123 maintains the operation mode of the printer 10 in the normal mode in response to the determination unit 122 determining that the event related to the shift to the idle state is not the event based on the cut command (ACT 3). In ACT 3, for example, the mode control unit 123 controls the power supply circuit 109 to maintain the power supply from the power supply circuit 109 to the processor 101, the main memory 102, the timer 103, the communication interface 104, the conveyance motor 105, the head driver 106, the cutter motor 107, the input port 108, and the like. The mode control unit 123 maintains the printer 10 in the idle state of the normal mode. The process returns to ACT 1. When the processor 101 acquires the print data in the middle of one transaction from the settlement processing terminal 30, the image based on the print data is printed on the receipt paper 20. When the processor 101 acquires the cut command from the settlement processing terminal 30, the receipt paper 20 is cut.

The mode control unit 123 shifts the operation mode of the printer 10 from the normal mode to the sleep mode in response to the determination unit 122 determining that the event related to the shift to the idle state is the event based on the cut command (ACT 4). In ACT 4, for example, the mode control unit 123 shifts the operation mode of the printer 10 from the normal mode to the sleep mode by controlling the power supply to components at least related to the printing. Specifically, the mode control unit 123 controls the power supply circuit 109 to stop the power supply to the conveyance motor 105, the head driver 106, the cutter motor 107, the input port 108, and the like. The mode control unit 123 maintains the power supply to the processor 101, the main memory 102, the timer 103, the communication interface 104, and the like. The mode control unit 123 shifts the operation mode of the printer 10 from the normal mode to the sleep mode by controlling the power supply as described above. When the print data in the start of one transaction is acquired from the settlement processing terminal 30, the processor 101 resets the flag indicating the cut command to "0" in the main memory 102.

According to this example, in response to the detection unit 121 detecting that the duration time of the idle state exceeds the predetermined time, the mode control unit 123 can change the control of shifting the operation mode from the normal mode to the sleep mode in accordance with the event related to the shift to the idle state. As a result, even when the duration time of the idle state exceeds the predetermined time, the mode control unit 123 can control the operation mode of the printer 10 to an appropriate mode. Therefore, the mode control unit 123 can control the shift of the operation mode from the normal mode to the sleep mode at an appropriate timing.

When the event related to the shift to the idle state is not the cut event, the mode control unit 123 can maintain the operation mode of the printer 10 in the normal mode. As a result, even when the duration time of the idle state exceeds the predetermined time, the mode control unit 123 can maintain the power supply from the power supply circuit 109 without shifting the operation mode of the printer 10 to the sleep mode. Therefore, for example, the printer 10 can maintain a state of the phase control of the motors. When the printer 10 receives the print data in the middle of one transaction from the settlement processing terminal 30, the conveyance of the receipt paper 20 can be appropriately performed by the conveyance motor 105. The printer 10 can print an image at an appropriate print position on the receipt paper 20.

When the event related to the shift to the idle state is the cut event, the mode control unit 123 can shift the operation mode of the printer 10 to the sleep mode. As a result, when the duration time of the idle state exceeds the predetermined time after the cut event, the mode control unit 123 can shift the operation mode of the printer 10 to the sleep mode. The mode control unit 123 can reduce power consumption by partially stopping the power supply from the power supply circuit 109.

As described above, the printer 10 can appropriately control the shift to the sleep mode according to the event immediately before the shift to the idle state. Therefore, the printer 10 can implement the shift of the operation mode, so that the print position can be avoided from being clogged when it is assumed that the print data in the middle of one transaction is received in the sleep mode while reducing the power consumption.

The program may be transferred in a state of being stored in an electronic device, or may be transferred in a state of not being stored in an electronic device. In the latter case, the program may be transferred via a network, or may be transferred in a state of being recorded in a recording medium. The recording medium is a non-transitory tangible medium. The recording medium is a medium that can be read by an electronic device. The recording medium may be a medium such as a CD-ROM or a memory card that can store a program and can be read by an electronic device, and a form thereof is not limited.

In addition, the embodiment has been described, but the embodiment is presented only as an example, and is not intended to limit the scope of the disclosure. Indeed, the novel embodiment described herein may be embodied in a variety of other forms; furthermore, various omissions, substitutions, and changes in the form of the embodiment described herein may be made without departing from the spirit of the disclosure. The embodiment and a modification thereof are included in the scope and the spirit of the disclosure and are also included in the invention described in the scope of claims and an equivalent scope thereof.

What is claimed is:

1. A printer, comprising:
   a print head configured to print an image based on print data on a recording medium;
   a cutter configured to cut the recording medium based on a cut command;
   a detector configured to detect a duration time of an idle state in a first mode exceeds a predetermined time; and
   a mode controller configured to shift, in response to the detector detecting that the duration time of the idle state exceeds the predetermined time, an operation mode from the first mode to a second mode in which consumed power is lower than that of the first mode, in accordance with an event related to shift to the idle state,
   wherein the mode controller at least one of:
   shifts the operation mode from the first mode to the second mode in response to the event related to the shift being based on the cut command;
   maintains the operation mode in the first mode in response to the event related to the shift not being based on the cut command; and
   shifts the operation mode from the first mode to the second mode by controlling power supply to a component related to printing.

2. The printer according to claim 1, wherein
   the mode controller shifts the operation mode from the first mode to the second mode in response to the event related to the shift being based on the cut command.

3. The printer according to claim 1, wherein
   the mode controller maintains the operation mode in the first mode in response to the event related to the shift not being based on the cut command.

4. The printer according to claim 2, wherein
   the mode controller shifts the operation mode from the first mode to the second mode by controlling power supply to a component related to printing.

5. The printer according to claim 1, wherein
   the predetermined time is measured in seconds.

6. The printer according to claim 1, wherein
   the idle state is continued from a timing at which the printer is shifted from an operating state to the idle state.

7. The printer according to claim 1, wherein
   the print head is configured to print the image on receipt paper.

8. The printer according to claim 1, wherein
   the print head is a thermal print head.

9. An information processing system, comprising:
   a settlement processing terminal comprising a scanner configured to scan and read a barcode of a purchased commodity; and
   a printer comprising:
   a print head configured to print an image based on print data from the settlement processing terminal on receipt paper,
   a cutter configured to cut the receipt paper based on a cut command from the settlement processing terminal,
   a detector configured to detect a duration time of an idle state in a first mode exceeds a predetermined time, and
   a mode controller configured to shift, in response to the detector detecting that the duration time of the idle state exceeds the predetermined time, an operation mode from the first mode to a second mode in which consumed power is lower than that of the first mode, in accordance with an event related to shift to the idle state.

10. The information processing system according to claim 9, wherein
    the settlement processing terminal is a point of sale terminal.

11. The information processing system according to claim 9, wherein
    the settlement processing terminal and the printer are connected by a network.

12. The information processing system according to claim 9, wherein
    the mode controller shifts the operation mode from the first mode to the second mode in response to the event related to the shift being based on the cut command.

13. The information processing system according to claim 9, wherein
    the mode controller maintains the operation mode in the first mode in response to the event related to the shift not being based on the cut command.

14. The information processing system according to claim 12, wherein
    the mode controller shifts the operation mode from the first mode to the second mode by controlling power supply to a component related to printing.

15. The information processing system according to claim 9, wherein
    the predetermined time is measured in seconds.

16. A printing method, comprising:
    printing an image based on print data on a recording medium;
    cutting the recording medium based on a cut command;
    detecting a duration time of an idle state in a first mode exceeds a predetermined time;
    shifting, in response to detecting that the duration time of the idle state exceeds the predetermined time, an operation mode from the first mode to a second mode in which consumed power is lower than that of the first mode, in accordance with an event related to shift to the idle state; and at least one of:
  shifting the operation mode from the first mode to the second mode in response to the event related to the shift being based on the cut command
  maintaining the operation mode in the first mode in response to the event related to the shift not being based on the cut command
  shifting the operation mode from the first mode to the second mode by controlling power supply to a component related to printing.

17. The printing method according to claim 16, further comprising:
  shifting the operation mode from the first mode to the second mode in response to the event related to the shift being based on the cut command.

18. The printing method according to claim 16, further comprising:
  maintaining the operation mode in the first mode in response to the event related to the shift not being based on the cut command.

19. The printing method according to claim 17, further comprising:
  shifting the operation mode from the first mode to the second mode by controlling power supply to a component related to printing.

* * * * *